United States Patent [19]

Nardone et al.

[11] Patent Number: 5,805,700
[45] Date of Patent: Sep. 8, 1998

[54] POLICY BASED SELECTIVE ENCRYPTION OF COMPRESSED VIDEO DATA

[75] Inventors: Joseph M. Nardone, Portland, Oreg.; Keith L. Shippy, Tempe, Ariz.; David W. Aucsmith, Portland, Oreg.

[73] Assignee: Intel Corporation, Santa Clara, Calif.

[21] Appl. No.: 730,065

[22] Filed: Oct. 15, 1996

[51] Int. Cl.⁶ .................................................. H04N 7/167
[52] U.S. Cl. .................................................. 380/10; 380/20
[58] Field of Search ........................................ 380/20, 10

[56] References Cited

U.S. PATENT DOCUMENTS

| | | | |
|---|---|---|---|
| 5,515,437 | 5/1996 | Katta et al. | 380/20 |
| 5,594,492 | 1/1997 | O'Callaghan et al. | 380/20 |
| 5,617,541 | 4/1997 | Albanese et al. | 380/42 |
| 5,621,794 | 4/1997 | Matsuda et al. | 380/20 |
| 5,621,799 | 4/1997 | Katta et al. | 380/20 |
| 5,625,693 | 4/1997 | Rohatgi et al. | 380/23 |
| 5,684,876 | 11/1997 | Pinder et al. | 380/37 |

*Primary Examiner*—Stephen C. Buczinski
*Attorney, Agent, or Firm*—Blakely, Sokoloff, Taylor & Zafman

[57] ABSTRACT

Basic transfer units (BTUs) of compressed video data of video images are selectively encrypted in accordance with an encryption policy to degrade the video images to at least a virtually useless state, if the selectively encrypted compressed video images were to be rendered without decryption. As a result, degradation that approximates the level provided by the total encryption approach is achieved, but requiring only a fraction of the processor cycle cost required by the total encryption approach, to decrypt and render the video images.

19 Claims, 6 Drawing Sheets

POLICY BASED SELECTIVE ENCRYPTION OF COMPRESSED VIDEO DATA

BACKGROUND OF THE INVENTION

1. Field of the Invention

This invention relates to the art of data encryption, and in particular, to the art of encrypting video data for subsequent rendering on processor-based video systems.

2. Background of the Invention

There is substantial interest in the computer and entertainment industries in incorporating video data into multimedia and related applications for use on processor-based video systems. Potential growth in this area has been enabled by the development of video compression schemes that reduce the amount of video data required to display high quality video images, and by the development of storage media, such as digital video discs (DVDs), which can accommodate data (in compressed form) for an entire movie on a single compact disc.

With the compressed data of an entire movie readily available in a single compact disc, naturally content providers are extremely concerned with the unauthorized copying of the content. Thus, content providers are planning to encrypt the compressed data. As a result, the video data must be decrypted before they can be decompressed for rendering. The present practice is to encrypt the entire content. However, the present practice has the disadvantage of significantly burdening the processor during the decryption and decompression phase. Experience has shown that the decryption and decompression of a fully encrypted MPEG compressed movie can consume as much as over 30% of the available processor cycles, even with the latest high performance processors. Thus, a less burdening approach to preventing unauthorized copying of MPEG compressed video data is desirable.

SUMMARY OF THE INVENTION

Basic transfer units (BTUs) of compressed video data of video images are selectively encrypted in accordance with an encryption policy to degrade the video images to at least a virtually useless state, if the selectively encrypted compressed video images were to be rendered without decryption. As a result, degradation that approximates the level provided by the total encryption approach is achieved, but requiring only a fraction of the processor cycle cost required by the total encryption approach, to decrypt and render the video images.

In some embodiments, the encryption policy is predetermined, while in others, it is dynamically adjusted. In one embodiment, where the video images are MPEG compressed, all BTUs containing either the start code for a group of pictures or the start code for a particular frame are encrypted, to prevent recovery of the video frames. In an alternate embodiment, a fraction of the BTUs of an I-frame, and a fraction of the BTUs of a P-frame are encrypted, to destroy data references by future frames.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Figure 1:
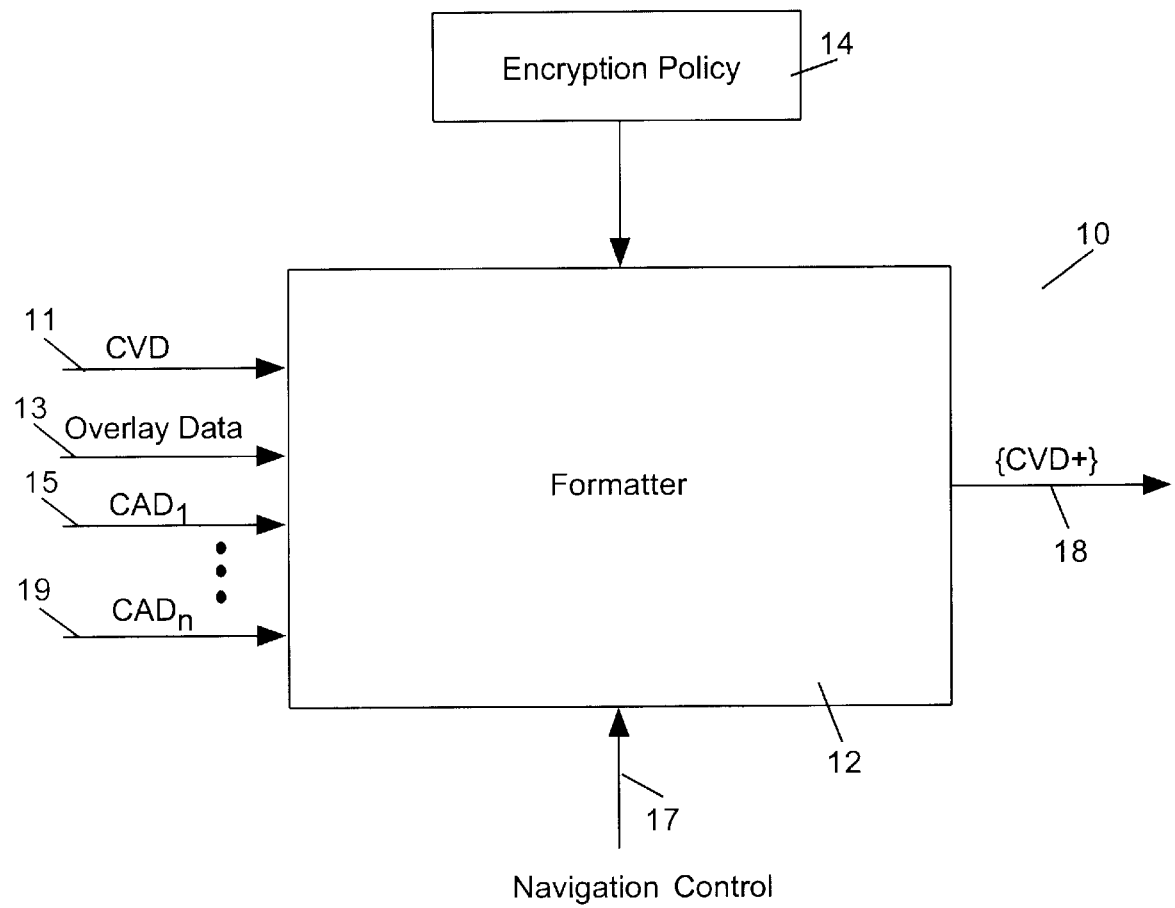
FIG. 1 is a block diagram illustrating the present invention.

Referring now to FIG. 1, wherein a block diagram illustrating the present invention is shown. As illustrated, formatter 12 of the present invention generates a formatted and partially encrypted stream of compressed video and related data {CVD+} 18 by selectively encrypting the basic transfer units (BTUs) of the compressed video and related data in accordance with an encryption policy 14. The BTUs are formed using compressed video data (CVD) 11, overlay data 13, e.g. closed captions, compressed audio data (CAD1 . . . CADn) 15, and navigation control 17. As will be readily apparent from the description to follow, the video images of {CVD+} 18 are degraded to a level that approximates the degradation achieved by a total encryption approach, but requiring only a fraction of the processor cycle cost required by the total encryption approach to decrypt and render the video images.

In one embodiment, video images are compressed in accordance with one of the standards promulgated by the Moving Pictures Expert Group (MPEG, group ISO-IEC-JTC1 SC29/WG11) and the Joint Photographic Experts Group (JPEG, ISO/IEC International Standard 10918-1). The amount of spatial and temporal redundancy in the video data is reduced by application of lossy data transformations. Hereafter, MPEG is used to refer to MPEG-1 (ISO standard 11172), MPEG-2 (ISO standard 13818ISO), and JPEG compliant compression processes. Audio data are dolby AC3 or MPEG audio (MPEG1 or MPEG2). The selected BTUs are encrypted employing a stream cipher technique.

Figure 2:
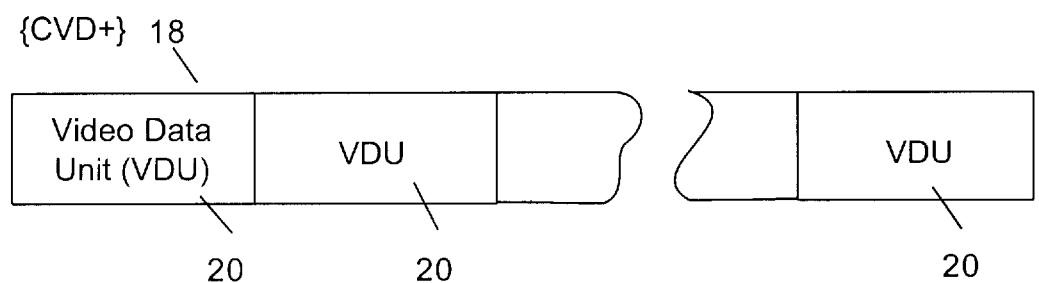
FIG. 2 illustrates a formatted stream of compressed video data in further details.
Figure 3:
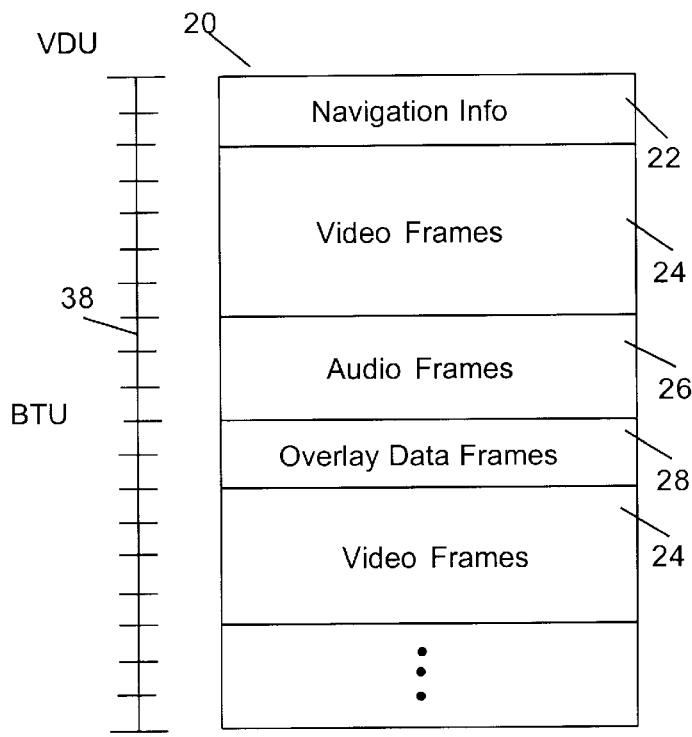
FIG. 3 illustrates one embodiment of a video data unit in further details.

FIG. 2 illustrates the formatted and partially encrypted {CVD+} 18 in further details. As shown, {CVD+} 18 are formatted into video data units (VDUs) 20. In an embodiment where the compressed video data are organized in accordance with a DVD scheme, VDUs 20 are video object units (VOBUs). FIG. 3 illustrates one embodiment of a VDU 20, more specifically, a VOBU corresponding to a group of pictures, in further details. As shown, a VDU 20 or VOBU includes navigation information 22, multiple series of compressed video frames 24 interleaved with series of compressed audio frames 26 and series of compressed overlay data frames 28, spanning a number of BTUs 38. The constitution of a BTU 38 is application dependent. An example of a BTU 38 is a data packet. In a DVD application, each BTU 38 corresponds to a data packet for a disk sector, in the order of 2 k bytes. In a digital satellite service (DSS) application, each BTU 38 corresponds to a transmission packet.

Figure 4:
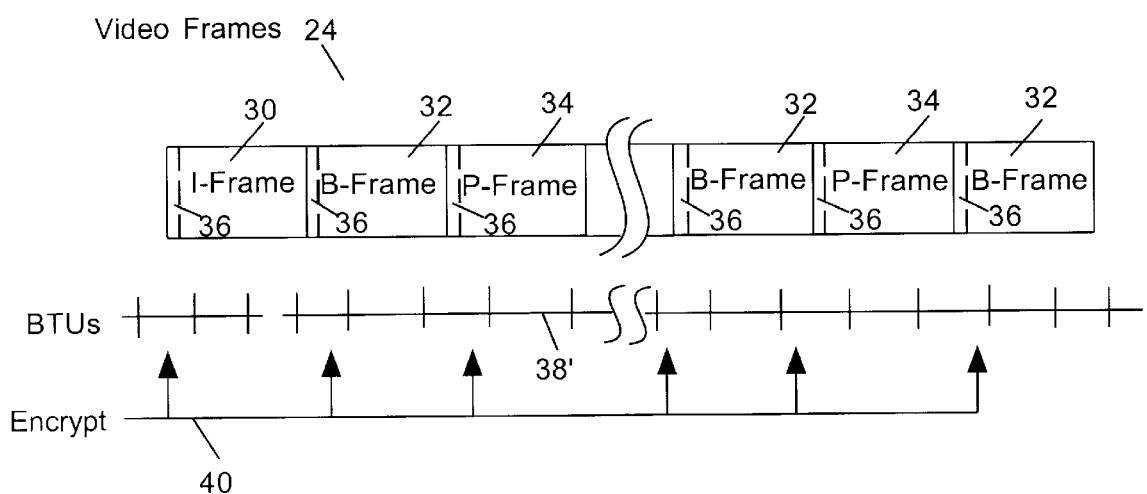
FIG. 4 illustrates a group of pictures in a video object unit in further details.

FIG. 4 illustrates a series of compressed video frames 24 in a VOBU in further details. As shown, a series of compressed video frames 24 include a compressed I-frame 30, a number of compressed B-frames 32, and a number of compressed P-frames 34, spanning the BTUs 38'. Note that neither I-frame 30, B-frames 32, nor P-frames 34 are boundary aligned with BTUs 38'. Each of I-frame 30, B-frames 32, and P-frames 34 includes a start code 36. Each VOBU, that is, each group of pictures, also includes a start code (not shown).

Compressed I-frame 30 is generated in reference to itself, and is used as a reference frame for reconstituting the group of pictures during decompression. Compressed I-frame 30 includes almost exclusively "motionless" macroblocks. Compressed B-frames 32 are generated using motion compensated predictions referencing preceding as well as subsequent I-frames and P-frames. Compressed B-frames 32 include mostly backward as well as forward motion vectors. Compressed P-frames 34 are generated using motion compensated predictions referencing preceding I-frames and P-frames. Compressed P-frames 34 include mostly forward motion vectors, and a small amount of motionless macroblocks. The manner in which compressed I-frame 30, B-frames 32 and P-frames 34 may be generated is well known in the art.

FIG. 4 also illustrates one embodiment of an encryption policy 40. As shown, in accordance with the illustrated embodiment of encryption policy 40, each BTU 38' containing the start code of either a group of pictures, an I-frame 30, one of the B-frames 32 or one of the P-frames 34 is encrypted. As will be appreciated by those skilled in the art, by encrypting each of the BTUs 38' containing the start code of a group of pictures or the start code of a frame, frames 30, 32 and 34 are unrecoverable, that is effectively "destroyed", if the video images of partially encrypted {CVD+} 18 are rendered without decryption. As will be also appreciated by those skilled in the art, the number of BTUs 38' containing start codes for the various groups of pictures and the start codes of I, B and P-frame 30, 32 and 34 is a very small percentage of all BTUs 38'. In other words, only a few percent of the processor cycles required by the total encryption approach for decryption will be required to decrypt and render the partially encrypted {CVD+} 18, and yet the video images of partially encrypted {CVD+} 18 are degraded to the same level (that is, total "destruction") as the degradation achieved by the total encryption approach.

In an alternate embodiment, a fraction of the BTUs of either the I-frames 30 or the P-frames 34 are encrypted, to destroy data references for future frames. For example, every 3 of 4 BTUs 38' of an I-frame 30 within a VOBU, and every fourth BTU 38' of an P-frame 34 within the VOBU are encrypted, to destroy data references for future frames. None of the BTUs 38' of B-frames 32 within a VOBU are encrypted. Experience has shown that the number of BTUs 38' encrypted is a small percentage of all BTUs 38'. In other words, only a few percent of the processor cycles required by the total encryption approach for decryption will be required to decrypt and render the partially encrypted {CVD+} 18, and yet the video images of partially encrypted {CVD+} 18 are degraded to a level that is virtually useless, approximating the degradation achieved by the total encryption approach.

Figure 5:
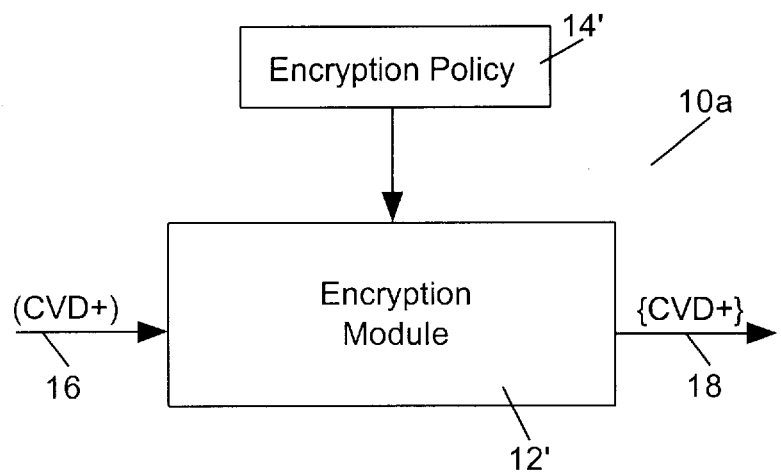
FIGS. 5–9 are block diagrams illustrating various embodiments of the present invention.
Figure 6:
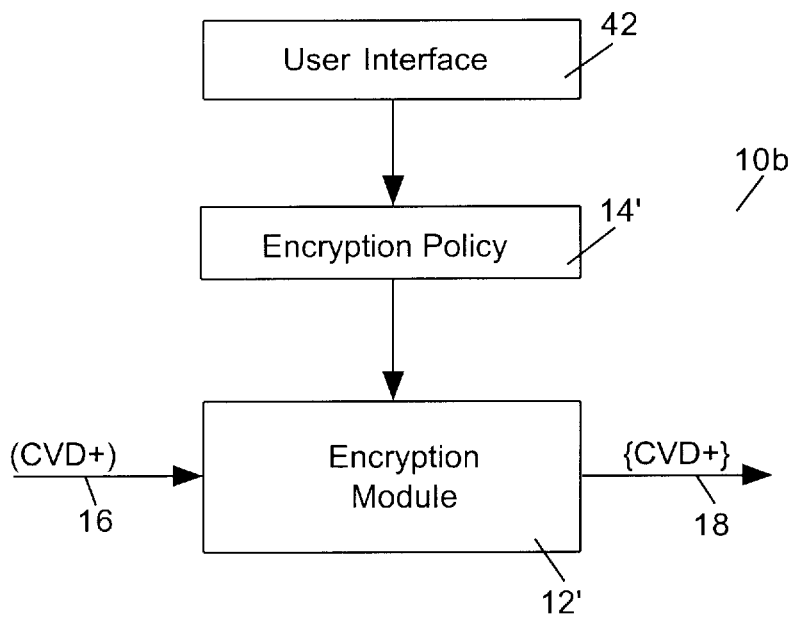
Figure 7:
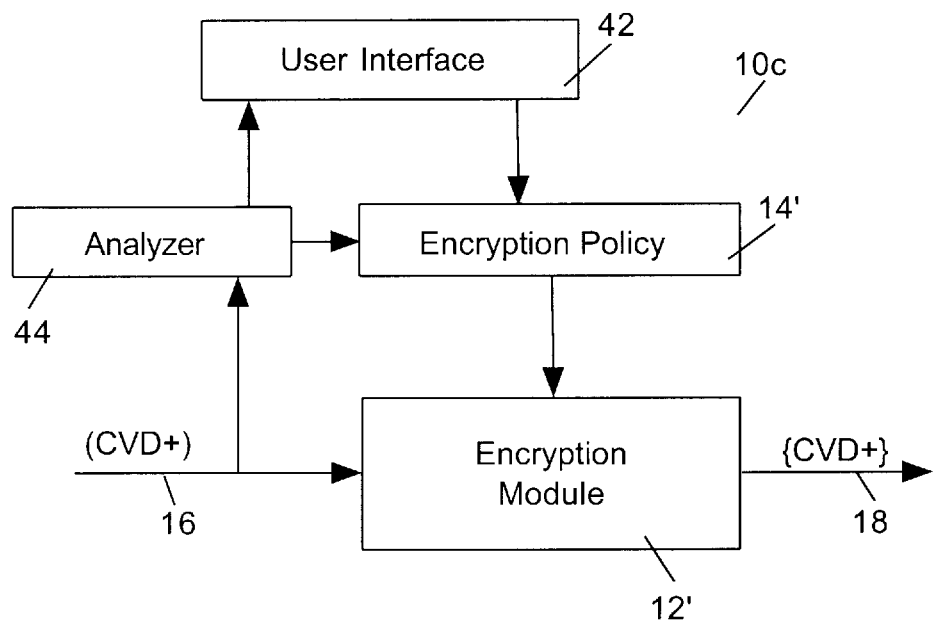

FIGS. 5–9 illustrates various embodiments of the present invention. FIG. 5 illustrates embodiment 10a wherein "formatter" 12 of FIG. 1 is replaced with encryption module 12'. Encryption module 12' performs the selective encryption based on encryption policy 14' as described earlier. However, encryption module 12' receives a formatted "clear" (that is, unencrypted) stream of compressed video and related data (CVD+) as input instead. FIG. 6 illustrates embodiment 10b wherein the present invention further includes user interface 42 for specifying encryption policy 14' for encryption modules 12'. FIG. 7 illustrates embodiment 10c wherein the present invention further includes analyzer 44 for analyzing the video images of CVD 16 to dynamically adjust encryption policy 14'. For examples, analyzer 44 may adjust encryption policy 14' based on certain frame statistics maintained for the video images of CVD 16. Alternatively, analyzer 44 may adjust encryption policy 14' based on the detection of a number constant or "slow" changing "landmarks", e.g. a mountain scene. Analyzer 44 may provide the analysis results to a user through user interface 42, who in turn will adjust encryption policy 14' through user interface 42. Alternatively, analyzer 44 may apply the analysis results directly to adjust encryption policy 14'. Statistical analysis of video images, as well as detection for "static" imagery in video images may be performed using any one of a number of these analysis techniques known in the art. Similarly, for both embodiments 10a and 10b, encryption module 12' may encrypt a selected BTU 38 using any number of encryption techniques known in the art.

Figure 8:
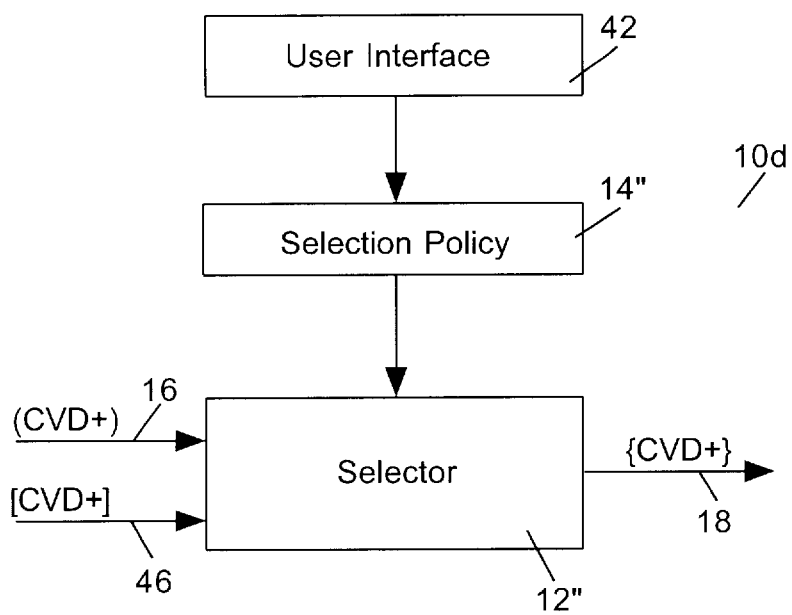
Figure 9:
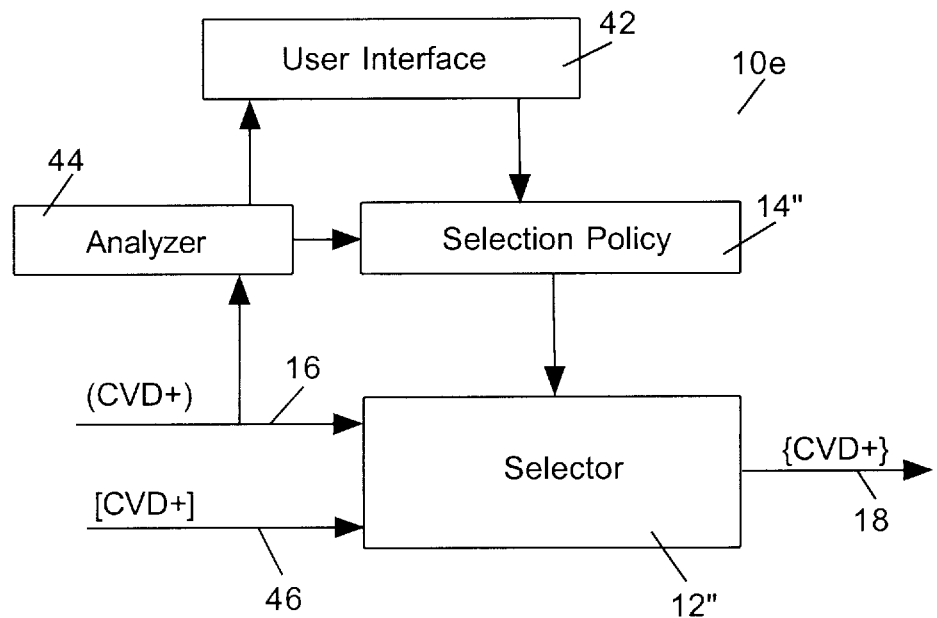

FIG. 8 illustrates embodiment 10d, which is similar to embodiment 10b, except "encryption" module 12" is implemented with a selector, and "encryption policy" 14" is implemented with a selection policy. "Encryption" or selector module 12" is provided with fully encrypted video images of CVD+ 16, that is [CVD+] 46, as well as CVD+ 16. Whenever a BTU 38 is selected for encryption, instead of encrypting the selected BTU 38 on the fly, selector 12" simply selects and outputs the corresponding portion of [CVD+] 46. FIG. 9 illustrates embodiment 10e, which is similar to embodiment 10c, except "encryption" module 12" is implemented with a selector, and "encryption policy" 14" is implemented with a selection policy, as described earlier.

Encryption module 12' as well as "encryption" or selector module 12" may be implemented in hardware or software.

Figure 10:
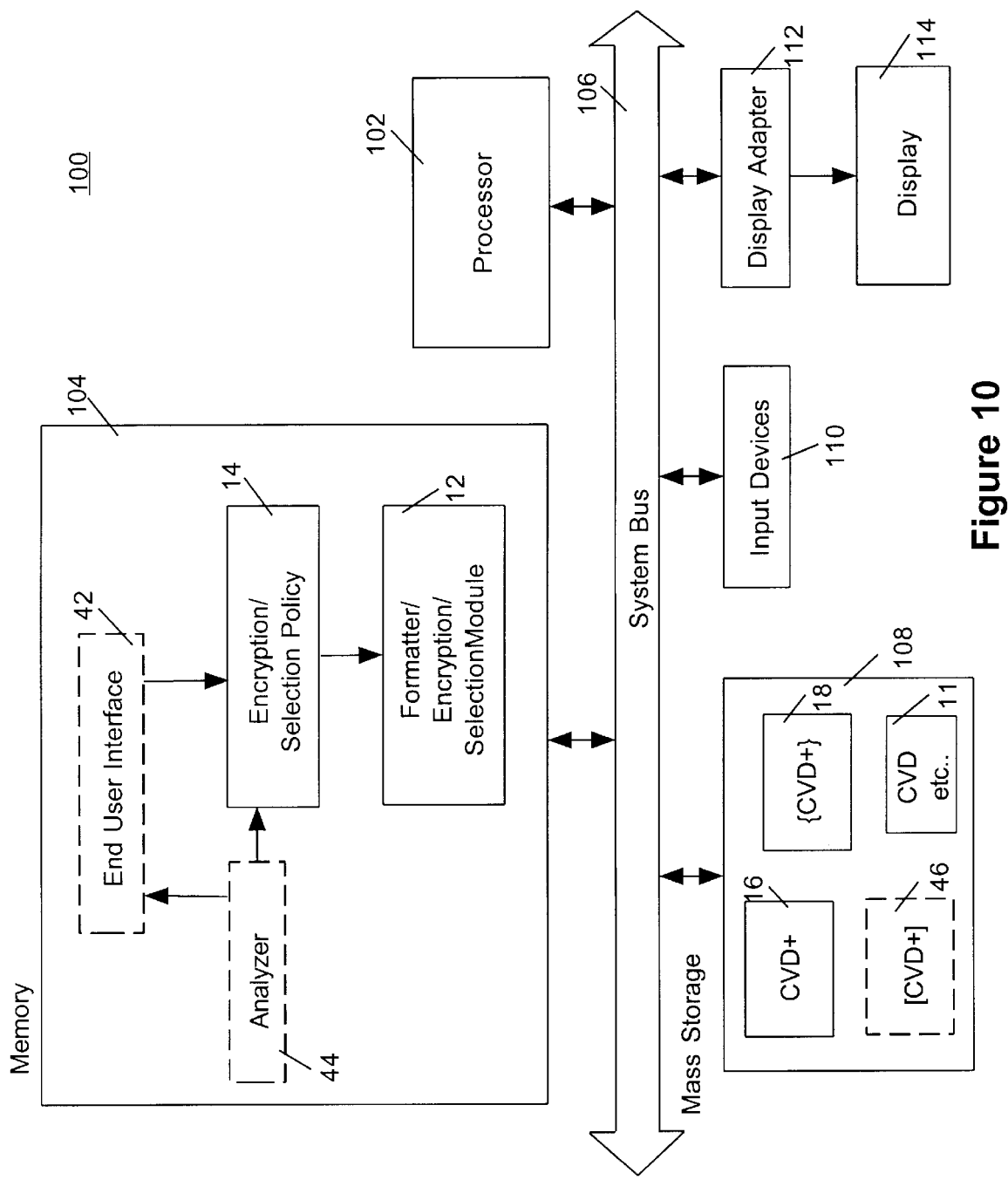
FIG. 10 illustrates one embodiment of a computer system suitable for practicing a software implementation of the present invention.

FIG. 10 illustrates one embodiment of a computer system suitable for practicing a software implementation of the present invention. As shown, for the illustrated embodiment, computer system 100 includes processor 102, memory 104, system bus 106, mass storage 108, input devices 110, display adapter 112 and display 114 coupled to each other as shown. Except for the manner they are used to practice the present invention, each of these elements 102–114 performs its corresponding conventional function known in the art, and each of these elements 102–114 is intended to represent a broad category of similar elements known in the art.

In particular, memory 104 is used to store a working copy each of formatter/encryption/selector module 12 and encryption/selection policy 14. Memory 104 may also be used to store a working copy each of end user interface 42 and analyzer 44. Mass storage 108 is used to store a working copy of CVD 11, CVD+ 16, {CVD+} 18, and/or [CVD+] 46. Alternatively, for systems with large memory or for small amount of video data, CVD 11, CVD+ 16, {CVD+} 18 and/or [CVD+] 46 may also be stored in memory 104. Finally, mass storage 108 may also be used to store a permanent copy of formatter/encryption/selector module 12 and encryption/selection policy 14, as well as end user interface 42 and analyzer 44.

While the present invention has been described in terms of the above illustrated embodiments, those skilled in the art will recognize that the invention is not limited to the embodiments described. The present invention may be practiced with modification and alteration within the spirit and scope of the appended claims. The description is thus to be regarded as illustrative instead of restrictive on the present invention.

Thus, a method and apparatus for policy based selective encryption of compressed video data has been described.

What is claimed is:

1. An apparatus comprising a formatter module for selectively encrypting basic transfer units (BTUs) of a stream of MPEG compressed video and related data in accordance with an encryption policy, the stream of MPEG compressed video and related data being organized into multiple video object units (VOBUs), with each VOBU being further organized into a plurality of BTUs, wherein the encryption policy prescribes for encryption of each BTU containing a start code of either a group of pictures, an I-frame, a B-frame or a P-frame.

2. An apparatus comprising a formatter module for selectively encrypting basic transfer units (BTUs) of a stream of MPEG compressed video and related data in accordance with an encryption policy, the stream of MPEG compressed video and related data being organized into multiple video object units (VOBUs), with each VOBU being further organized into a plurality of BTUs, wherein the encryption policy prescribes for encryption of a fraction of the BTUs of an I-frame within a VOBU.

3. The apparatus as set forth in claim 2, wherein
the encryption policy prescribes for encryption of three of every four BTUs of an I-frame within a VOBU.

4. An apparatus comprising a formatter module for selectively encrypting basic transfer units (BTUs) of a stream of MPEG compressed video and related data in accordance with an encryption policy, the stream of MPEG compressed video and related data being organized into multiple video object units (VOBUs), with each VOBU being further organized into a plurality of BTUs, wherein the encryption policy prescribes for encryption of a fraction of the BTUs of a P-frame within a VOBU.

5. The apparatus as set forth in claim 4, wherein
the encryption policy prescribes for encryption of every fourth BTU of a P-frame within a VOBU.

6. An apparatus comprising an encryption module for selectively encrypting basic transfer units (BTUs) of a stream of MPEG compressed video data in accordance with an encryption policy, the stream of MPEG compressed video data being organized into multiple video object units (VOBUs), with each VOBU being further organized into a plurality of BTUs, wherein the encryption policy prescribes for encryption of each BTU containing a start code of either a group of pictures, an I-frame, a B-frame or a P-frame within a VOBU.

7. An apparatus comprising an encryption module for selectively encrypting basic transfer units (BTUs) of a stream of MPEG compressed video data in accordance with an encryption policy, the stream of MPEG compressed video data being organized into multiple video object units (VOBUs), with each VOBU being further organized into a plurality of BTUs, wherein the encryption policy prescribes for encryption of a fraction of the BTUs of an I-frame within a VOBU.

8. The apparatus as set forth in claim 7, wherein
the encryption policy prescribes for encryption of three of every four BTUs of an I-frame, within a VOBU.

9. An apparatus comprising an encryption module for selectively encrypting basic transfer units (BTUs) of a stream of MPEG compressed video data in accordance with an encryption policy, the stream of MPEG compressed video data being organized into multiple video object units (VOBUs), with each VOBU being further organized into a plurality of BTUs, wherein the encryption policy prescribes for encryption of a fraction of the BTUs of a P-frame within a VOBU.

10. The apparatus as set forth in claim 9, wherein
the encryption policy prescribes for encryption of every fourth BTU of a P-frame within a VOBU.

11. An apparatus comprising a selector module for generating a partially encrypted stream of MPEG compressed video data by selectively outputting basic transfer units (BTUs) of a formatted (but unencrypted) stream of MPEG compressed video data and BTUs of a formatted and encrypted stream of MPEG compressed video data, in accordance with a selection policy, each of the formatted unencrypted and encrypted streams of MPEG compressed video data being organized in multiple video object units (VOBUs), with each VOBU being further organized into a plurality of BTUs, wherein the selection policy prescribes for selection of each BTU containing a start code of either a group of pictures, an I-frame, a B-frame or a P-frame within a VOBU from the formatted encrypted stream of MPEG compressed video data.

12. An apparatus comprising a selector module for generating a partially encrypted stream of MPEG compressed video data by selectively outputting basic transfer units (BTUs) of a formatted (but unencrypted) stream of MPEG compressed video data and BTUs of a formatted and encrypted stream of MPEG compressed video data, in accordance with a selection policy, each of the formatted unencrypted and encrypted streams of MPEG compressed video data being organized in multiple video object units (VOBUs), with each VOBU being further organized into a plurality of BTUs, wherein the selection policy prescribes for selection of a fraction of the BTUs of an I-frame within a VOBU from the formatted encrypted stream of MPEG compressed video data.

13. The apparatus as set forth in claim 12, wherein p1 the selection policy prescribes for selection of three of every four BTUs of an I-frame, within a VOBU, from the formatted encrypted stream of MPEG compressed video data.

14. An apparatus comprising a selector module for generating a partially encrypted stream of MPEG compressed video data by selectively outputting basic transfer units (BTUs) of a formatted (but unencrypted) stream of MPEG compressed video data and BTUs of a formatted and encrypted stream of MPEG compressed video data, in accordance with a selection policy, each of the formatted unencrypted and encrypted streams of MPEG compressed video data being organized in multiple video object units (VOBUs), with each VOBU being further organized into a plurality of BTUs, wherein the selection policy prescribes for selection of a fraction of the BTUs of a P-frame within a VOBU from the formatted encrypted streams of the MPEG compressed video data.

15. The apparatus as set forth in claim 14, wherein the selection policy prescribes for encryption of every fourth BTU of a P-frame within a VOBU from the formatted encrypted stream of MPEG compressed video data.

16. An apparatus comprising a storage medium having stored therein a plurality of programming instructions for implementing an encryption function for selectively encrypting basic transfer units (BTUs) of MPEG compressed video data, in accordance with an encryption policy, the MPEG compressed video data being organized into multiple video object units (VOBUs), with each VOBU being further organized into a plurality of BTUs, wherein the encryption policy prescribes for encryption of each BTU containing a start code of a group of pictures or a start code of a frame within a VOBU; and an execution unit coupled to the storage medium for executing the plurality of programming instructions during operation.

17. The apparatus as set forth in claim 16, wherein the encryption policy prescribes for encryption of a fraction of the BTUs of an I-frame or a P-frame within a VOBU.

18. An apparatus comprising a storage medium having stored therein a plurality of programming instructions for implementing a selection function for generating a partially encrypted stream of MPEG compressed video data by selectively outputting basic transfer units (BTUs) of an unencrypted stream of MPEG compressed video data and BTUs of an encrypted stream of MPEG compressed video data, in accordance with a selection policy, each of the unencrypted and encrypted streams of MPEG compressed video data being organized into multiple video object units (VOBUs), with each VOBU further being organized into a plurality of BTUs, wherein, the selection policy prescribes for selection of each BTU containing a start code a group of pictures or a start code of a frame within a VOBU, from the encrypted stream of compressed video data;

an execution unit coupled to the storage medium for executing the plurality of programming instructions during operation.

19. The apparatus as set forth in claim 18, wherein the selection policy prescribes for selection of a fraction of the BTUs of either an I-frame or a P-frame within a VOBU, from the encrypted streams of the MPEG compressed video data.

* * * * *